United States Patent
Willats et al.

(10) Patent No.: US 10,895,190 B2
(45) Date of Patent: *Jan. 19, 2021

(54) INSULATED HEAT SHIELD FOR VEHICLE EXHAUST SYSTEM

(71) Applicant: Faurecia Emissions Control Technologies, USA, LLC, Columbus, IN (US)

(72) Inventors: Robin Willats, Columbus, IN (US); Jerome Brian Hornback, Indianapolis, IN (US); Jeffery Warren Prairie, Franklin, IN (US); John G. Rohde, Columbus, IN (US); Thibaut Contremoulins, Belfort (FR); Maria Saur, Augsburg (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/085,232

(22) PCT Filed: Mar. 23, 2017

(86) PCT No.: PCT/US2017/023713
§ 371 (c)(1),
(2) Date: Sep. 14, 2018

(87) PCT Pub. No.: WO2017/165587
PCT Pub. Date: Sep. 28, 2017

(65) Prior Publication Data
US 2019/0072022 A1    Mar. 7, 2019

Related U.S. Application Data

(60) Provisional application No. 62/312,541, filed on Mar. 24, 2016.

(51) Int. Cl.
*F01N 13/14* (2010.01)
*F01N 3/20* (2006.01)
(Continued)

(52) U.S. Cl.
CPC ......... *F01N 13/141* (2013.01); *B01D 53/944* (2013.01); *B01D 53/9418* (2013.01);
(Continued)

(58) Field of Classification Search
CPC .... F01N 13/141; F01N 13/2066; F01N 13/14; F01N 13/148; F01N 13/16;
(Continued)

(56) References Cited

U.S. PATENT DOCUMENTS 3,237,716 A * 3/1966 Parsons .................. F01N 13/14
                                                          181/243
4,085,816 A * 4/1978 Amagai ................. F01N 13/14
                                                          180/89.2
(Continued)

FOREIGN PATENT DOCUMENTS

DE    202014104869 U1    1/2016
EP         2703614 A1    3/2014
(Continued)

OTHER PUBLICATIONS

International Search Report and Written Opinion for PCT/US2017/023713, dated Jun. 28, 2017.
(Continued)

*Primary Examiner* — Craig M Schneider
*Assistant Examiner* — David R Deal
(74) *Attorney, Agent, or Firm* — Carlson, Gaskey & Olds, P.C.

(57) ABSTRACT

An exhaust component assembly includes a heat shield and a mounting structure to attach the heat shield to an outer housing of an exhaust component. The mounting structure
(Continued)

comprises a primary insulator located between an outer surface of the outer housing and an inner surface of the heat shield and at least one secondary insulator positioned adjacent to the primary insulator. A method of assembling the heat shield to the outer housing of the exhaust component assembly is also disclosed.

25 Claims, 4 Drawing Sheets

(51) Int. Cl.
*F01N 3/28* (2006.01)
*F01N 13/18* (2010.01)
*B01D 53/94* (2006.01)
*F01N 13/16* (2010.01)

(52) U.S. Cl.
CPC ....... *B01D 53/9477* (2013.01); *F01N 3/2066* (2013.01); *F01N 3/2892* (2013.01); *F01N 13/148* (2013.01); *F01N 13/16* (2013.01); *F01N 13/1805* (2013.01); *F01N 2240/20* (2013.01); *F01N 2260/20* (2013.01); *F01N 2610/02* (2013.01); *F01N 2610/1453* (2013.01); *Y02A 50/20* (2018.01); *Y02T 10/12* (2013.01)

(58) Field of Classification Search
CPC ............. F01N 13/1805; F01N 2240/20; F01N 2260/20; F01N 2610/02; B91D 53/9418; B91D 53/944; B91D 53/9477; Y02A 50/2325; Y02T 10/24
USPC ........................................................ 138/110
See application file for complete search history.

(56) References Cited

U.S. PATENT DOCUMENTS

| | | | | |
|---|---|---|---|---|
| 5,603,297 | A * | 2/1997 | Wolf | B60R 13/0869 |
| | | | | 123/195 C |
| 5,649,510 | A * | 7/1997 | Linze | F02B 77/11 |
| | | | | 123/198 E |
| 5,844,177 | A * | 12/1998 | Pirchl | B60R 13/08 |
| | | | | 181/211 |
| 5,882,608 | A | 3/1999 | Sanocki et al. | |
| 6,041,595 | A | 3/2000 | Halimi et al. | |
| 6,116,022 | A * | 9/2000 | Woodward | B01D 53/94 |
| | | | | 422/174 |
| 6,438,949 | B1 | 8/2002 | Nozaki | |
| 7,007,720 | B1 * | 3/2006 | Chase | F16L 59/12 |
| | | | | 138/110 |
| 7,976,788 | B2 | 7/2011 | Drost et al. | |
| 8,104,573 | B2 * | 1/2012 | Oxenknecht | B60R 13/0876 |
| | | | | 181/200 |
| 8,186,325 | B2 * | 5/2012 | Upton | B60R 13/0869 |
| | | | | 123/195 A |
| 8,424,296 | B2 * | 4/2013 | Burgers | F01N 3/2889 |
| | | | | 60/298 |
| 8,951,323 | B2 | 2/2015 | Kumar | |
| 2006/0065480 | A1 | 3/2006 | Leehaug | |
| 2014/0196442 | A1 | 7/2014 | Katou et al. | |
| 2014/0342115 | A1 | 11/2014 | Sakane et al. | |
| 2015/0056881 | A1 * | 2/2015 | Zhang | B32B 5/00 |
| | | | | 442/268 |
| 2015/0260075 | A1 | 9/2015 | Schweiggart | |
| 2016/0069244 | A1 * | 3/2016 | Kato | E04B 1/7612 |
| | | | | 428/178 |

FOREIGN PATENT DOCUMENTS

| | | |
|---|---|---|
| JP | 2006009693 A | 1/2006 |
| JP | 2007162570 A | 6/2007 |
| WO | 2015012829 A1 | 1/2015 |

OTHER PUBLICATIONS

International Search Report and Written Opinion for PCT/US2017/023715, dated Jun. 28, 2017.

International Search Report and Written Opinion for PCT/US2017/023717, dated Jun. 28, 2017.

International Search Report and Written Opinion for PCT/US2017/023720, dated Jun. 28, 2017.

* cited by examiner

INSULATED HEAT SHIELD FOR VEHICLE EXHAUST SYSTEM

RELATED APPLICATION

This application claims priority to U.S. Provisional Application No. 62/312,541, filed Mar. 24, 2016.

BACKGROUND OF THE INVENTION

Vehicles include an exhaust system that transports exhaust gas generated by a combustion engine to a location on the vehicle where the heated exhaust gas can be emitted safely. Exhaust systems can include various combinations of the following components: pipes, tubes, resonators, converters, catalysts, filters, mixers, mufflers, etc. The entire exhaust system becomes very hot after a short period of operation due to the high temperatures generated during the combustion processes that produce the exhaust gas. As such, one or more of the components often utilize an outer heat shield to reduce the overall exposed external surface temperature of the components.

A typical heat shield is a thin sheet of metal that is stamped or otherwise formed to conform generally to the shape of the component to which the heat shield is to be attached, such as a muffler for example. The heat shield may be formed with legs or other structures that provide areas for attaching the heat shield to the muffler. Remaining portions of the heat shield are spaced along an outer surface of the muffler to insulate external areas of the shield from the muffler. The heat shield is typically secured to the muffler by welding; however, other attachment methods, such as straps, rivets, etc. have been used additionally or alternatively.

In certain environments it is important to shield as much of a hot exhaust component as possible. For example, some specifications may require as high as 99% of the outer surface of the component to be less than a specified temperature. This requirement can be difficult to achieve with larger components and with components having complex shapes. Further, the various attachment structures used to attach the heat shield to the component provide direct conduits for transferring heat to the heat shield, which can make it difficult to maintain a desired low outer surface temperature.

SUMMARY OF THE INVENTION

According to one exemplary embodiment, an exhaust component assembly includes a heat shield and a mounting structure to attach the heat shield to an outer housing of an exhaust component. The mounting structure comprises a primary insulator located between an outer surface of the outer housing and an inner surface of the heat shield and at least one secondary insulator positioned adjacent to the primary insulator.

In another embodiment according to the previous embodiment, the primary insulator comprises an insulating mat wrapped around the outer housing.

In another embodiment according to any of the previous embodiments, the insulating mat has a first edge and a second edge opposite of the first edge, and wherein the at least one secondary insulator comprises at least a first piece of material positioned at the first edge and a second piece of material positioned at the second edge.

In another embodiment according to any of the previous embodiments, the first and second pieces of material comprise first and second bands or rings.

In another exemplary embodiment, a method of assembling a heat shield to an outer housing of an exhaust component assembly includes positioning a primary insulator between an outer surface of the outer housing and an inner surface of the heat shield, positioning at least one secondary insulator adjacent to the primary insulator, and placing the heat shield over the primary and secondary insulators such that the heat shield is held fixed relative to the outer housing.

In another embodiment according to any of the previous embodiments, the heat shield is held fixed in compression against the outer housing.

In another embodiment according to any of the previous embodiments, the insulating mat is wrapped around the outer housing, and the at least one secondary insulator comprises a first band or ring positioned adjacent to one edge of the insulating mat and a second band or ring positioned adjacent to an opposite edge of the insulating mat. The heat shield is compressed against the insulating mat and the first and second bands or rings, and the heat shield is held in compression against the outer housing with at least one attachment structure.

In another embodiment according to any of the previous embodiments, the insulating mat is formed from a plurality of layers of material that include at least a first layer of compressible material and a second layer of high heat insulation material.

These and other features of the present invention can be best understood from the following specification and drawings, the following of which is a brief description.

DETAILED DESCRIPTION

Figure 1:
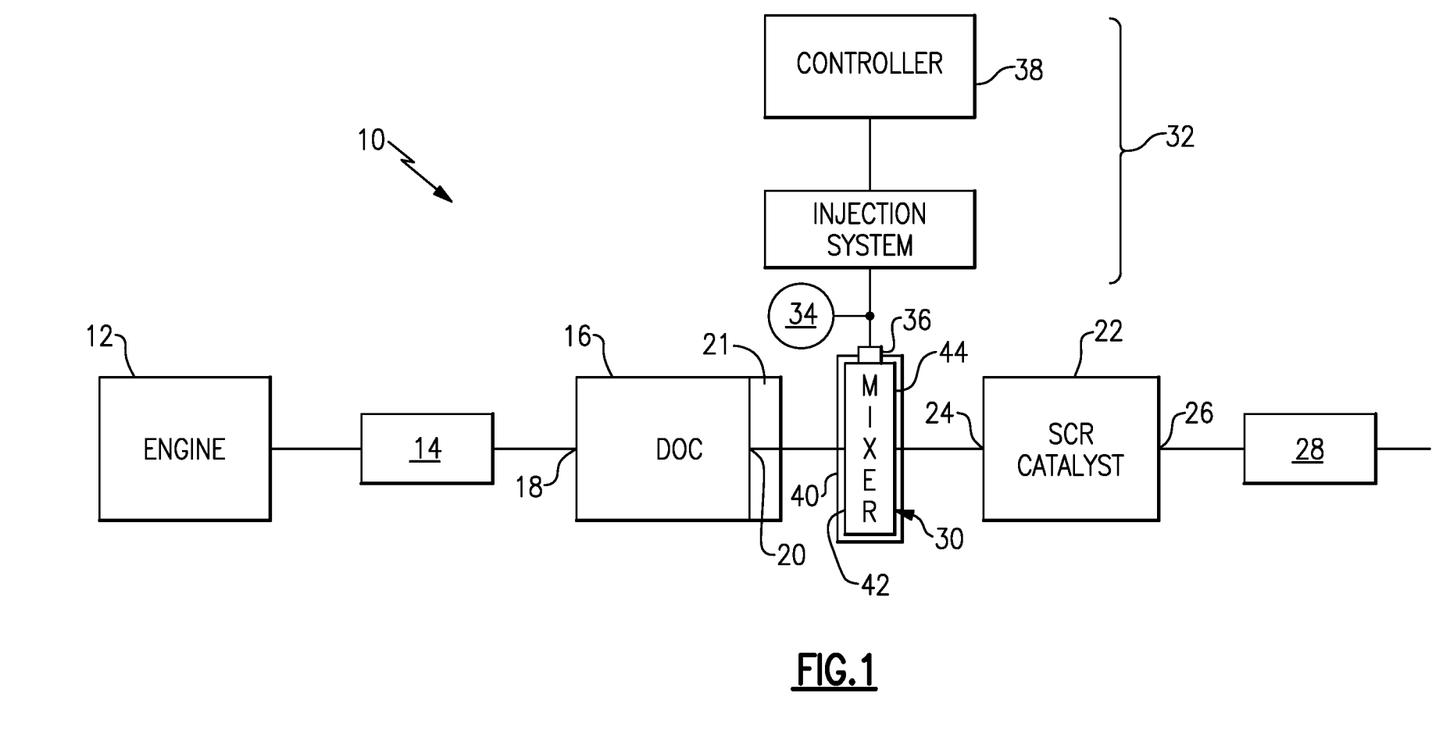
FIG. 1 is a schematic view of a vehicle exhaust system.

FIG. 1 shows a vehicle exhaust system 10 that conducts hot exhaust gases generated by an engine 12 through various upstream exhaust components 14 to reduce emission and control noise as known. Downstream from the engine are various upstream exhaust components 14 that can include one or more of the following in any combination: pipes, filters, valves, catalysts, mufflers, etc. In one example configuration, the various upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known.

Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following in any combination: pipes, filters, valves, catalysts, mufflers, etc. The components shown in FIG. 1 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference. An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known. Such a system in combination with a mixer is disclosed in U.S. application Ser. Nos. 14/737533 and 14/737,546 for example, which are assigned to the assignee of the present invention and are herein incorporated by reference.

Figure 2:
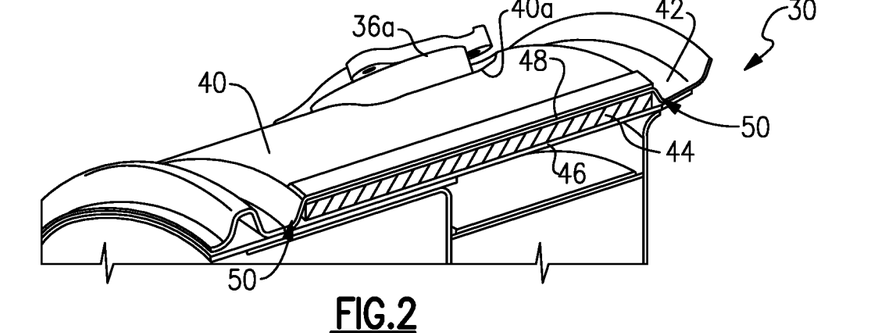
FIG. 2 is a perspective view in section of one example of a mixer and heat shield assembly as used in the vehicle exhaust system of FIG. 2.

In one example, the mixer 30 includes a heat shield 40 that is mounted to an outer housing 42 of the mixer 30 using a unique low conductive support mount configuration. The low conductive support mount is configured such that the heat internally within the exhaust component is maintained at the desired temperature levels while the outer surface of the component is maintained at much cooler surface temperatures. In one example embodiment shown in FIG. 2, the low conductive support mount comprises a primary insulator 44 that is located between an outer surface 46 of the outer housing 42 and an inner surface 48 of the heat shield 40, and one or more secondary insulators 50 positioned adjacent opposing sides of the primary insulator 44. The heat shield 40 includes openings as needed, such as for example, an opening 40a for a mount structure as for the doser 36 as shown in FIG. 2. The combination of primary 44 and secondary 50 insulators is used to insulate the heat shield 40 from the outer housing 42 by removing direct contact (conduction path) between the housing 42 and heat shield 40, while also maintaining a generally constant gap between them.

Figure 3:
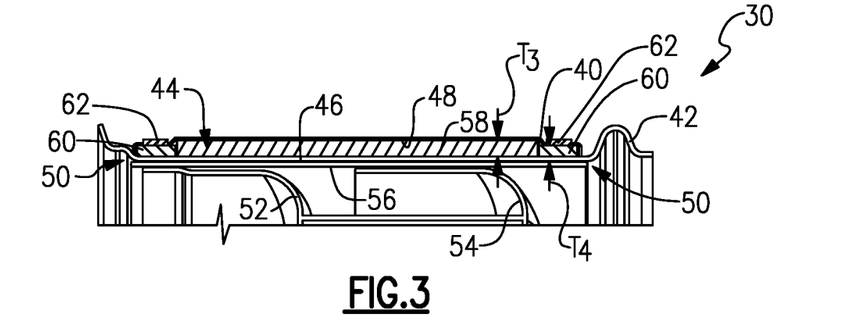
FIG. 3 is a section view of another example of a heatshield and mount assembly for a mixer such as that shown in FIG. 2, wherein the heatshield and mount assembly are in a compressed and final installation position.

FIG. 3 shows a section view of the mixer 30 which includes inlet 52 and outlet 54 baffles that are surrounded by a mixer body 56. The body 56 is mounted within the outer housing 42 of the mixer 30. In this example, the primary insulator 44 comprises an insulation mat 58 that surrounds the outer surface 46 of the housing 42. The secondary insulators 50 comprise one or more bands or rings 60 that are used in combination with the insulation mat 58 to mount the heat shield 40 on the housing 42. In the example shown, one ring 60 is placed at one edge of the mat 58 and another ring 60 is placed at an opposite edge of the mat 58. The heat shield 40 is placed over outer surfaces of the mat 58 and rings 60 and is then compressed radially inward to compress the mat 58 against the housing 42. One or more additional attachment structures such as straps or clamps 62, for example, are then used to hold the mat 58 in compression.

Figure 4:
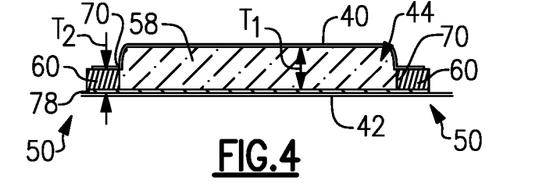
FIG. 4 is a schematic view of the heatshield and mount assembly of FIG. 3 in an uncompressed state prior to final installation.

FIG. 4 shows an example where the mat 58 in an uncompressed state and FIG. 3 shows an example of the mat 58 being in a compressed state where the heat shield 40 is secured using clamps 62. While clamps are shown in FIG. 3, it should be understood that other attachment structures could be used to hold the mat 58 and heat shield in compression against the outer housing 42.

The heat shield 40 can be made from a metallic material such as a steel sheet for example, or the heat shield 40 can be made from a non-metallic material such as composite or plastic material, for example. The rings 60 protect the mat 58, provide structural support for the heat shield 40, and resist movement of the heat shield 40 during vehicle operation. The rings 60 can comprise a band of fiber mat or a fibrous material such as rope, for example. The rings 60 preferably comprise bands of a high-stiffness mat, a rope of braided rope material, a rope of braided wire material, a rope that includes glass fibers, or other similar materials. The rings 60 can be comprised of a compressible or non-compressive material. In one example, the mat 58 has a first stiffness and the rings 60 have a second stiffness that is greater than the first stiffness.

In the example shown in FIG. 3-4, both the mat 58 and rings 60 are compressed by the heat shield 40 against the outer housing 42. FIG. 4 shows the mat 58 having an initial first thickness T1 and the rings 60 having an initial second thickness T2 in the uncompressed state. The heat shield 40 is then placed around the mat 58 and rings 60 and is compressed in a radially inward direction. This causes the mat 58 to be compressed to a final thickness T3 that is less than the initial first thickness T1, and the rings 60 to be compressed to a final thickness T4 that is less than the initial second thickness T2 (FIG. 3). The clamps 62 are then secured over opposing edges of the heat shield 40 at radially outward positions that overlap each of the rings 60 such that in this final installation position, the heat shield 40 is held in compression against the housing 42. Distal ends 68 of the heat shield 40 remained spaced apart from the housing 42 when compressed.

Figure 5:
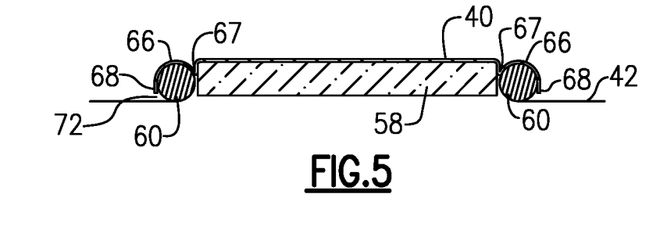
FIG. 5 is a section view of another example of a heatshield and mount assembly.

FIG. 5 shows an example where clamps are not used to hold the heat shield 40 in compression. Instead, edge portions 66 of the heat shield 40 are formed to extend around the rings 60. In one example, the edge portions 66 are formed as circumferential indentations. Optionally, the indentations could be replaced by barbs to hold the rings 60 in place. These edge portions 66 can be pre-formed and pressed against the mat 58 and rings 60 or the edge portions 66 can be plastically, i.e. permanently, deformed around the rings 60 during installation to hold the mat 58 and heat shield 58 in compression against the housing 42. The edge portions 66 can be roll-formed, stamped, molded, welded, cast, etc. An indented area 67 between an edge of the mat 58 and the curved indentation helps locate and define a boundary between the ring 60 and mat 58. The edge portions 66 help prevent movement of the heat shield 40 once the shield is compressed. The edge portions 66 are deformed such that the distal ends 68 of the edge portions 66 remain spaced apart from the housing 42 such that there is no direct heat transfer contact.

In this example configuration, the mat 58 provides structural support to attach the heat shield 40 to the housing 42 without the use of any other attachment structures. As portions of the heat shield 40 are compressed around the mat 58 and against the housing 42, the portions are subsequently attached to each other to hold the mat 58 and shield 40 in compression against the housing 42. This will be discussed in greater detail below.

In one example, the rings 60 can comprise a high-stiffness, non-compressive mat that is placed on opposing sides 70 of the mat 58. The heat shield 40 is compressed against the mat 58 causing the mat 58 to decrease in thickness from the initial first thickness to a smaller final second thickness while the non-compressive mat at each of the opposing sides 70 remains at substantially the same thickness. Clamps 62 or other attachment structures can then be used to hold the heat shield 40 in compression against the housing 42.

The configurations shown in FIGS. 2-5 each include a central insulating mat 58 and two pieces of material such as braided rope, braided wire, or high-stiffness mat that are placed at opposing edges 70 of the mat 58. The two pieces of material comprise the bands or rings 60, and in one example, these rings 60 are in direct abutting contact with the edges 70 of the mat, the outer surface 46 of the housing 42 and the inner surface 48 of the heat shield 40. Further, in each of the examples, once the heat shield 40 is held in compression against the housing 42, the distal edges 68 of the heat shield 40 remain spaced from the outer surface 46 of the housing by a gap 72.

Figure 9:
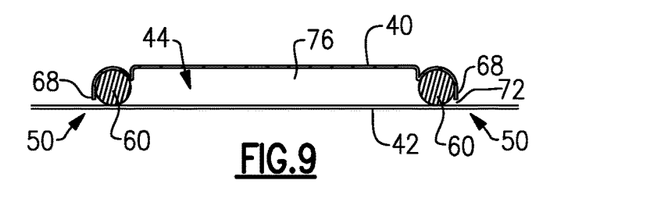
FIG. 9 is a section view of another example of a heatshield and mount assembly.

Optionally, instead of using a low-cost insulating mat 58, the mat 58 can be replaced by an air gap 76 (FIG. 9) to reduce cost. The air gap 76 comprises the primary insulator 44 and the rings 60 comprise the secondary insulators 50 that are used to hold the heat shield 40 in the desired location relative to the outer housing 42.

In one example, a support layer 78 (FIG. 4) for the mat 58 and/or rings 60 is applied to the outer surface 46 of the housing 42. In one example, the support layer 78 comprises a layer of adhesive material that holds the mat 58 and/or rings 60 in place until an attachment structure such as clamps 62, straps or bolts, for example, are installed to hold the heat shield 40 in compression against the housing 42. Optionally, the rings 60 and mat 58 can be attached to the support layer 78 to form an assembly that is then wrapped around the housing 42 as a unit. Use of the support layer 78 provides the benefit of a simple and effective installation of the heat shield 40.

In each of the examples, the rings 60 can be sealed or unsealed structures depending upon the desired specifications. Ideally, the rings 60 should provide structural support, insulation, and sealing to the heat shield 40 and component assembly. When the rings 60 are comprised of a rope made of braided fibers, the rope can be treated with a coating, for example, to be waterproof and to act as a seal. When the rings 60 are comprised of a band or ring made from a mat that is sensitive to water, an additional seal might be needed. This seal can be made of insulating foam or be a gasket made with heat-insulating material, such as mica, for example.

In one example, the central mat 58 and rings 60 can be manufactured as one assembly for easier installation. Further, the cross-sectional shape of the rings 60 can be circular, oval, square, rectangular, etc.

In one example, the rings 60 comprise two square or rectangular section braided wire bands that are 10-20 mm in width and which can withstand outer surface temperatures of 500-600 degrees Celsius. The polygonal section braided wire bands should have a high density/low compressibility such that when the bands are compressed they are approximately 7 mm thick in a radial direction. The ring material should comprise a material with very low thermal conductivity, such as less than 0.1 W/m·K at 600 degrees Celsius, for example.

In one example, the mat 58 comprises a fiber mat that is 10-15 mm thick when uncompressed (T1), and is approximately 7 mm when compressed (T3). As discussed above, a layer or sheet of adhesive can be applied to the housing 42 as the support layer 78, and the mat 58 and bands 60 can then be attached as a unit or individually in a direct manner to the adhesive. Optionally, the mat 58 and bands 60 can be attached to the adhesive sheet prior to attachment to the housing 42 with the components then being wrapped as an assembly about the housing 42. Once the mat 58 and bands 60 are in place on the housing, the heat shield 40 is installed such that the bands and mat are compressed.

Figure 6:
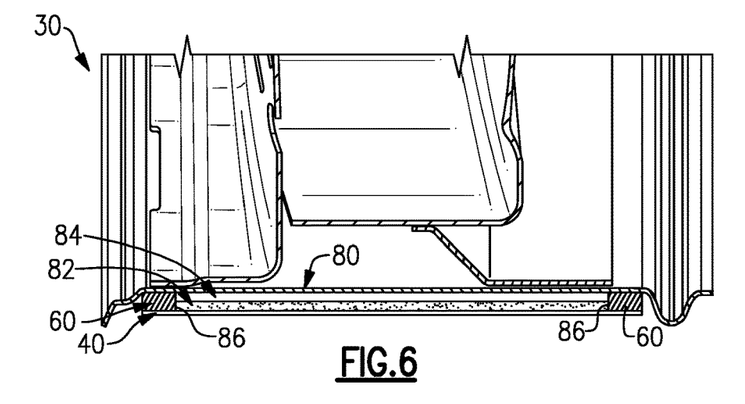
FIG. 6 is a section view of another example of a heatshield and mount assembly.

FIGS. 2-5 show an example where the insulating mat 58 is comprised of a single layer of material. FIG. 6 shows an example of a mat 80 that is comprised of a plurality of layers of material. In this configuration certain layers can provide a more compressible role while other layers can provide a higher quality or level of heat insulation. In one example, the mat 80 is comprised of a first layer 82 of compressible material such as fiber material for example, and a second layer 84 of high heat insulation material, such as microporous material for example. Examples of high heat insulation material include, for example, non-fibrous material with a high porosity (microporous), low density aerogels (silica aerogels), porous fibrous material, foams with ceramic content, porous ceramic material (alumina/silica products), or other similar materials. The bands or rings 60 are positioned on opposing sides 86 of the mat 80.

Figure 7:
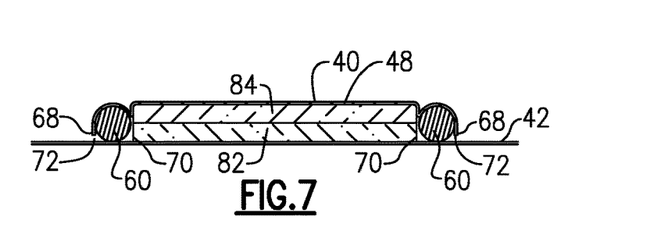
FIG. 7 is a section view of another example of a heatshield and mount assembly.
Figure 8:
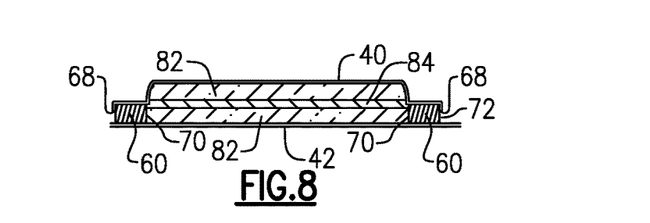
FIG. 8 is a section view of another example of a heatshield and mount assembly.

In the example shown in FIG. 6, the microporous second layer 84 is positioned directly between the outer surface 46 of the housing 42 and the first layer 82. FIG. 7 shows an example where the microporous second layer 84 is positioned directly between the inner surface 48 of the heat shield 40 and the first layer 82. FIG. 8 shows an example where the microporous second layer 84 is positioned directly between two layers 82 of the compressible material. In each of the embodiments, polygonal or circular bands or rings 60 as described above are positioned at the opposing sides 86 of the mat 80.

In one example, the heat shield 40 is made of two C-shaped heat shield portions 90 (FIG. 10) that are attached together when a pressure is applied during assembly. The possible types of attachment include clamping, clipping, brazening or welding the two portions together. In one example, the heat shield portions 90 are wrapped around the mat 58, 80 and rings 60 and are compressed against the housing 42 at a pressure sufficient to compress the mat 58, 80 to a desired level. Edges of the heat shield portions 90 can then be attached together such that the heat shield 40 is held in compression against the housing 42.

Figure 10:
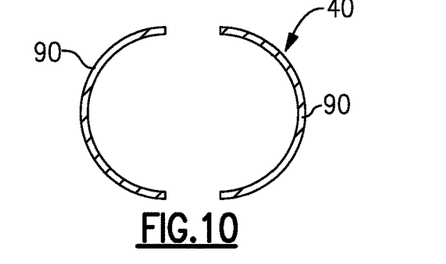
FIG. 10 is a schematic view of a heat shield formed from two shield sections.

As such, the whole mixer assembly 30 is held together in compression. The heat shield 40 is put in position at a defined and controlled pressure as discussed above. The heat shield portions 90 are attached together when the pressure is applied. If the compressive force is not sufficient to maintain the assembly in place due to axial loading, some features can be added to the housing 42 to help keeping the assembly in place, such as mechanical stops for example. If the compressive force is not sufficient to maintain the assembly in place due to radial loading, additional mount structures such as straps or clamps 62 can be installed.

Figure 11:
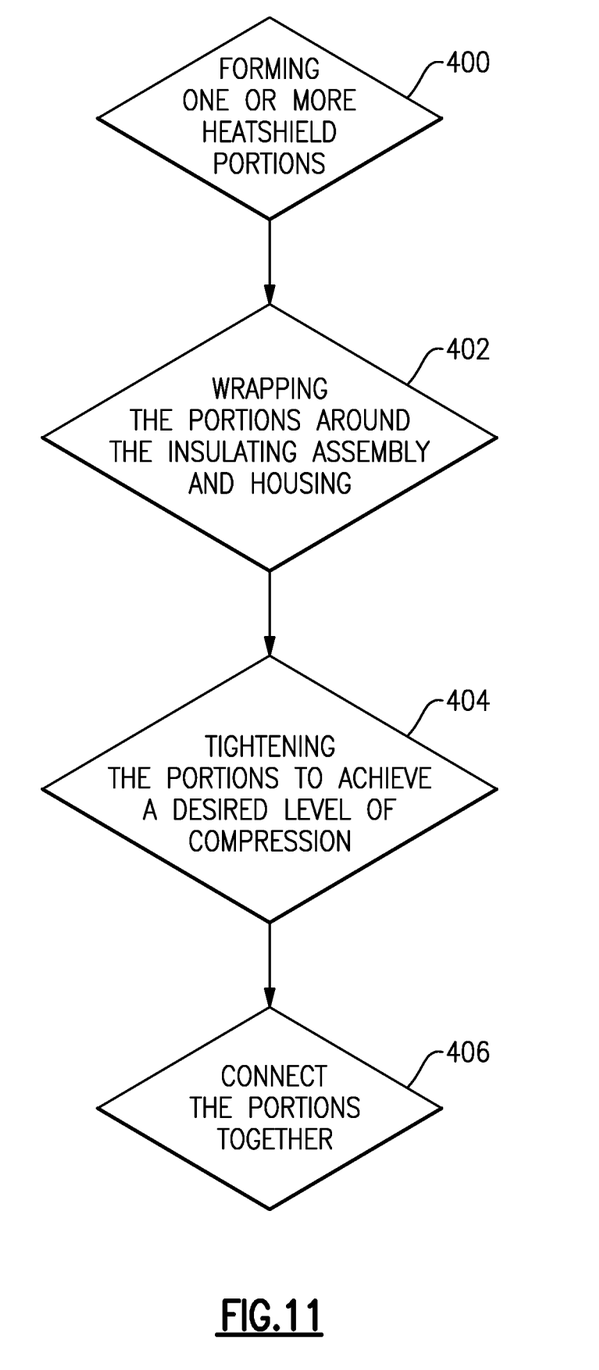
FIG. 11 is a flow chart describing one example method of assembling a heat shield onto an exhaust component.

In one example method using a tourniquet process, the method includes a step of forming 400 (FIG. 11) the heat shield portions 90 by pre-rolling the portions 90, for example, and then wrapping 402 the portions 90 around the internal insulating assembly 44, 50 and mixer housing 42. The portions 90 are then tightened 404 around the internal insulating assembly and are tack welded to each other at a location where the portions 90 overlap with each other. The portions 90 are tightened until a desired level of compressive force is achieved for the subject component application. Next, the heat shield portions 90 are connected to each other 406 at an overlap seam that is sealed via welding or brazing, for example. It should be understood that this is just one example of an assembly method and that other methods of compressing the internal insulating assembly can be used.

It should be understood that while the heat shield 40 and unique low conductive support mount configuration are shown in this example as being mounted to a mixer 30, the subject heat shield and associated mounting configuration can be used with any other vehicle exhaust system component as needed. For example, the subject heat shield mounting configurations could be used with mufflers, DOCs, DPFs, tailpipes, etc. Further, the subject heat shield mounting configurations could be used with larger box-shaped system components that include flat sides, where the heatshield would be pre-formed to get in compression.

The subject invention utilizes a unique mounting structure for a heat shield 40, where the mounting structure comprises a primary insulator 44 in combination with one or more secondary insulators 50 as described above. The insulating mats 58, 80 serve as the primary insulators and are used as structural support to attach the heat shield 40 to the outer housing 42. The secondary insulators 50 are configured to hold the heat shield 40 and mat 58, 80 in place relative to the outer housing 42. The secondary insulators comprise bands or rings 60 that provide for a higher stiffness area than that of the mat.

As discussed above, temperatures at the outer surface 46 of the housing 42 can be as high as 600 degrees Celsius. In each of the disclosed examples, the heat shield and mounting structure cooperate with each other to maintain as high as 90-99% of an outer surface of the heat shield at a temperature that can be as low as approximately 300 degrees Celsius or even as low as 200 degrees Celsius, for example, which is a significant improvement over existing heat shield configurations.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An exhaust component assembly comprising:
a heat shield; and
a mounting structure to attach the heat shield to an outer housing of an exhaust component, wherein the mounting structure comprises a primary insulator located between an outer surface of the outer housing and an inner surface of the heat shield and at least one secondary insulator positioned adjacent the primary insulator and located between the outer surface of the outer housing and the inner surface of the heat shield.

2. The exhaust component assembly according to claim 1 wherein the primary insulator comprises an insulating mat wrapped around the outer housing.

3. The exhaust component assembly according to claim 2 wherein the insulating mat has a first edge and a second edge opposite of the first edge, and wherein the at least one secondary insulator comprises at least a first piece of material positioned at the first edge and a second piece of material positioned at the second edge.

4. The exhaust component assembly according to claim 2 wherein the insulating mat is comprised of a plurality of layers of material that include at least a first layer of compressible material and a second layer of high heat insulation material.

5. The exhaust component assembly according to claim 1 wherein the heat shield and mounting structure cooperate with each other to maintain more than 90% of an outer surface of the heat shield at a temperature as low as 200 degrees Celsius.

6. The exhaust component assembly according to claim 1, wherein the exhaust component comprises a mixer having an inlet that receives exhaust gases from a vehicle engine and an outlet that directs a mixture of exhaust gases and reducing agent to a downstream exhaust component.

7. The exhaust component assembly according to claim 1 wherein the secondary insulator has a greater stiffness than the primary insulator, and wherein the secondary insulator is positioned adjacent to at least one edge of the primary insulator.

8. The exhaust component assembly according to claim 1 wherein the heat shield is held in compression against the outer housing after attachment such that distal ends of the heat shield remain spaced apart from the housing when compressed.

9. An exhaust component assembly comprising:
a heat shield; and
a mounting structure to attach the heat shield to an outer housing of an exhaust component, wherein the mounting structure comprises a primary insulator located between an outer surface of the outer housing and an inner surface of the heat shield and at least one secondary insulator positioned adjacent the primary insulator and the primary insulator comprises an insulating mat wrapped around the outer housing, and wherein the insulating mat has a first edge and a second edge opposite of the first edge, and wherein the at least one secondary insulator comprises at least a first piece of material positioned at the first edge and a second piece of material positioned at the second edge, and wherein the heat shield is placed over outer surfaces of the first and second pieces of material and the insulating mat and is held in compression against the outer housing by at least one attachment structure.

10. The exhaust component assembly according to claim 9 wherein the at least one attachment structure comprises at least one clamp or strap that holds the heat shield in compression against the first and second pieces of material and the insulating mat.

11. The exhaust component assembly according to claim 9 wherein, when the heat shield is held in compression by the at least one attachment structure, the insulating mat and first and second pieces of material are compressed from an initial thickness to a final thickness that is less than the initial thickness.

12. The exhaust component assembly according to claim 9 wherein the first and second pieces of material comprise first and second rings or bands.

13. The exhaust component assembly according to claim 12 wherein the insulating mat has a first stiffness, and wherein the first and second rings or bands have a second stiffness that is greater than the first stiffness.

14. The exhaust component assembly according to claim 12 wherein the insulating mat has a first thickness, and wherein the first and second rings or bands have a second thickness that is less than the first thickness.

15. The exhaust component assembly according to claim 12 wherein the first and second rings or bands comprise a fibrous material, a braided rope material, or a braided wire material.

16. The exhaust component assembly according to claim 9 wherein the at least one attachment structure comprises a portion of the heat shield that is formed to hold the first and second pieces of material in compression against the outer housing.

17. An exhaust component assembly comprising:
a heat shield; and
a mounting structure to attach the heat shield to an outer housing of an exhaust component, wherein the mounting structure comprises a primary insulator located between an outer surface of the outer housing and an inner surface of the heat shield and at least one secondary insulator positioned adjacent the primary insulator, and wherein the primary insulator comprises an air gap and wherein the at least one secondary insulator comprises at least a first ring or band positioned at one edge of the air gap and a second ring or band positioned at an opposite edge of the air gap.

18. A method of assembling a heat shield to an outer housing of an exhaust component assembly comprising the steps of:
positioning a primary insulator between an outer surface of the outer housing and an inner surface of the heat shield;
positioning at least one secondary insulator adjacent to the primary insulator; and
placing the heat shield over the primary and secondary insulators such that the heat shield is held fixed relative to the outer housing, and compressing the heat shield against the outer housing.

19. The method according to claim 18 including deforming a portion of the heat shield around the at least one secondary insulator to hold the secondary insulator in compression against the outer housing.

20. The method according to claim 18 wherein the primary insulator comprises an insulating mat and the at least one secondary insulator comprises at least first and second bands or rings, and including the steps of
wrapping the insulating mat around the outer housing,
positioning the first band or ring adjacent one edge of the insulating mat,
positioning the second band or ring adjacent an opposite edge of the insulating mat,
compressing the heat shield against the insulating mat and first and second bands or rings, and
holding the heat shield in compression against the outer housing with at least one attachment structure.

21. The method according to claim 20 including forming the insulating mat from a plurality of layers of material that include at least a first layer of compressible material and a second layer of high heat insulation material.

22. The method according to claim 18 wherein the secondary insulator has a greater stiffness than the primary insulator, and including positioning the secondary insulator adjacent to at least one edge of the primary insulator.

23. The method according to claim 18 wherein distal ends of the heat shield remain spaced apart from the housing when compressed.

24. A method of assembling a heat shield to an outer housing of an exhaust component assembly comprising the steps of:
positioning a primary insulator between an outer surface of the outer housing and an inner surface of the heat shield;
positioning at least one secondary insulator adjacent to the primary insulator; and
placing the heat shield over the primary and secondary insulators such that the heat shield is held fixed relative to the outer housing, and wherein the primary insulator and the at least one secondary insulator provide structural support to attach the heat shield to the outer housing without any other attachment structures.

25. An exhaust component assembly comprising:
a heat shield; and
a mounting structure to attach the heat shield to an outer housing of an exhaust component, wherein the mounting structure comprises a primary insulator located between an outer surface of the outer housing and an inner surface of the heat shield and at least one secondary insulator positioned adjacent the primary insulator, and wherein the primary insulator and the at least one secondary insulator provide structural support to attach the heat shield to the outer housing without any other attachment structures.

* * * * *